United States Patent [19]

Robbi

[11] 4,249,119
[45] Feb. 3, 1981

[54] DIGITAL DRIVE CIRCUIT FOR ELECTRIC MOTOR OR THE LIKE

[75] Inventor: Anthony D. Robbi, Hopewell, N.J.

[73] Assignee: RCA Corporation, New York, N.Y.

[21] Appl. No.: 970,806

[22] Filed: Dec. 18, 1978

[51] Int. Cl.³ .............................................. H02P 5/16
[52] U.S. Cl. .................................... 318/341; 318/314; 318/318; 180/179
[58] Field of Search ........................ 318/314, 318, 341; 235/92 PL, 92 PE, 92 CA, 92 CT; 328/58, 48; 180/179

[56] References Cited

U.S. PATENT DOCUMENTS

| 3,278,727 | 10/1966 | Geis ..................................... 235/92 PE |
| 3,840,815 | 10/1974 | Masters ................................... 328/48 |
| 3,937,932 | 2/1976 | Ahlgren ............................. 235/92 PL |
| 3,950,682 | 4/1976 | Dohanich, Jr. ....................... 318/341 |
| 4,165,490 | 8/1979 | Howe, Jr. et al. ....................... 328/58 |

Primary Examiner—David Smith, Jr.
Attorney, Agent, or Firm—Samuel Cohen; Carl V. Olson

[57] ABSTRACT

A digital drive current for application to a variable-speed electric motor is generated from a binary signal including N high-order bits and n low-order bits. A pulse waveform of fixed frequency higher than the frequency to which the motor can respond is generated to have a pulse width duty cycle in accordance with the value of the high-order bits. The low-order bits are used to make a one-step increase in the width of a proportion, determined by the value of the low-order bits, of the pulses of the pulse waveform, so that the average pulse width is increased a desired fraction of one step.

10 Claims, 4 Drawing Figures

DIGITAL DRIVE CIRCUIT FOR ELECTRIC MOTOR OR THE LIKE

This invention relates to means for generating a pulse train having a variable duty cycle for use in providing a variable drive to a utilization device such as an electric motor.

The invention is useful in an automobile wherein an electronic computer computes digital numbers representing the amplitudes of drive currents which should be applied to an electric motor driving a fuel pump, for example. Each digital number is used to control the duty cycle of a current pulse wave, and the energy in the current pulse wave applied to the electric motor is integrated by the motor, so that the motor is driven with an energy proportional to the digital number.

It is known to provide a variable drive to an electric motor in the form of a current pulse wave having a constant frequency of about 4,000 Hz and a variable duty cycle (a variable pulse width), so that a digital-to-analog conversion is accomplished in the motor itself. The number of different steps between zero duty cycle and 100 percent duty cycle is determined by how many binary digits there are in the digital number from the computer. For example, a binary number of 8 bits provides $2^8$ or 256 different steps between zero and 100 percent drive. The 256 steps may be represented by 256 cycles of a 1,024,000 Hz clock frequency $F_c$ used by the computer. The 256 cycles of the clock occur during the period of one cycle of a 4,000 Hz pulse wave $f_o$. The 4,000 Hz pulse wave may have any one of 256 duty cycles, or stated another way, may have pulses of any one of 256 widths determined by a corresponding number of the 256 cycles of the clock.

In a system in which an 8-bit binary number determines one of 256 different values of motor drive current, the fineness of control may be too coarse at low levels of drive, where each step is a large percentage of a low value, compared with high levels of drive where each step is a small percentage of a high value. To double the number of steps in the 0.00025-second period of the 4,000 Hz pulse wave, it is necessary to use a 9-bit binary number and to double the 1,024,000 Hz frequency of the clock. Since the latter may be impractical, there is a need for means to provide a variable electric drive in finer steps than 1/256 without increasing the frequency of the clock, and without increasing the size of the 8-bit bus from the computer.

An example of the invention includes a first means to generate a current drive pulse wave having any one of $2^N$ pulse widths to provide a duty cycle according to the value of a binary number of N bits, and a second means to make a half-step increase in the duty cycle of the pulse wave by making a one-step increase in the widths of one-half the pulses of the pulse wave, or more generally, to make a fractional step change in the duty cycle by making a one step change in the widths of a corresponding fraction of the pulses in the pulse wave.

Figure 1:
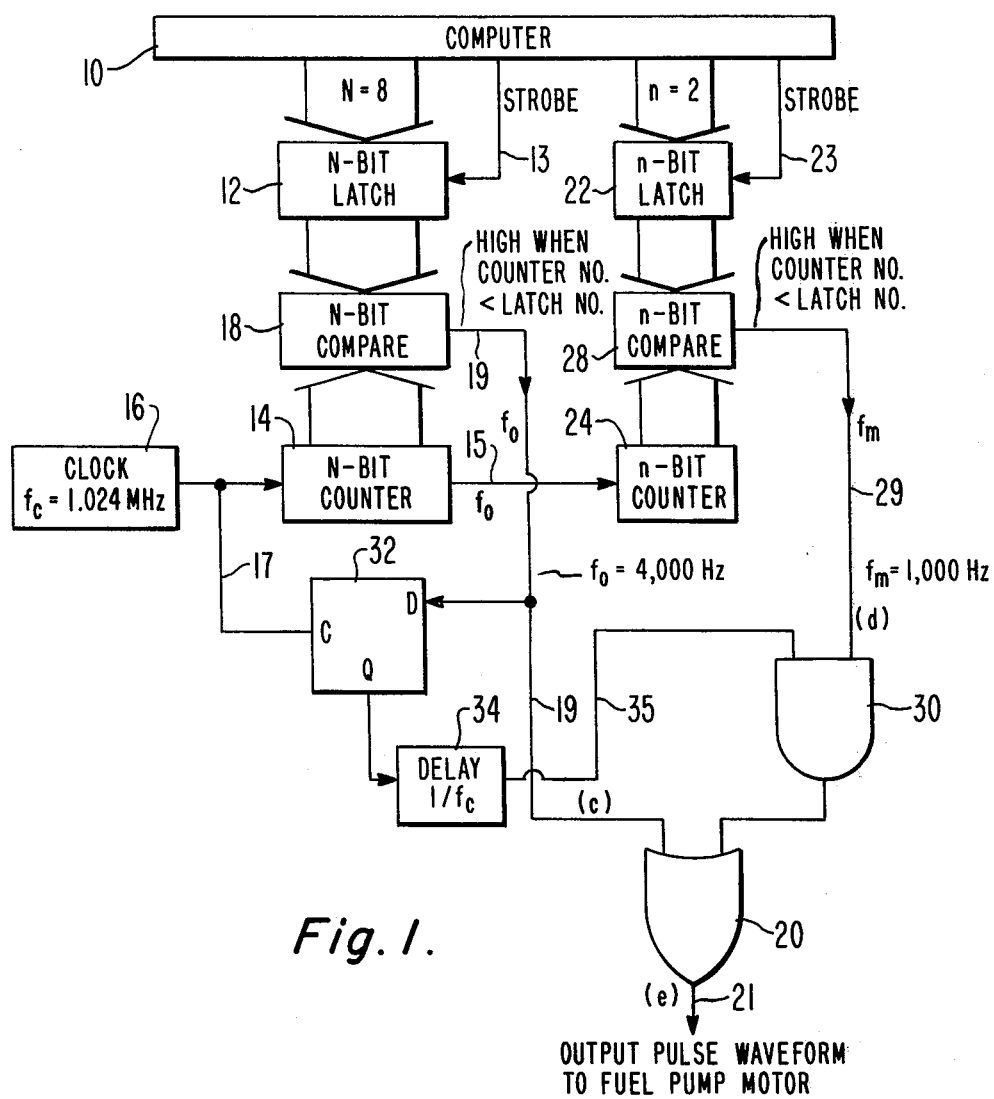
FIG. 1 is a block diagram of apparatus constructed according to the teachings of the invention to generate a pulse wave in which the pulses have a width determined by the value of an N-bit binary signal, and in which a fraction of the pulses determined by the value of an n-bit binary number are made one step wider.

Referring now in greater detail to FIG. 1, a computer 10 in an automobile has inputs from a plurality of sensors (not shown) in the automobile from which it computes a binary number representing the amplitude of electric current drive which should be supplied to an electric motor (not shown) connected to a fuel pump (not shown). The binary number consists of N high-order bits and n low-order bits, where in the example to be described, N is equal to 8, and n is equal to 2. When N is equal to 8, the 8 high-order bits represent any one of $2^N = 2^8 = 256$ discrete values between 0 and 256. The 2 low-order bits represent any one of $2^n = 2^2 = 4$ discrete values between 0 and 4.

The 8 high-order bits are transferred from the computer to an 8-bit latch 12 under control of a strobe signal on line 13. An 8-bit ring counter 14 repeatedly counts 256 cycles of the 1,024,000 Hz output of clock 16, which clock may be in the computer 10, and provides an output pulse wave at 15 having a frequency $f_o = 4,000$ Hz. That is, upon the completion of each count to 256, counter 14 produces an output pulse. The contents of the 8-bit latch 12 and the 8-bit counter 14 are applied to an 8-bit comparator 18. The comparator 18 provides an output at 19 which is high so long as the number in the counter 14 is less than the number in the latch 12. So long as a given binary number between 0 and 256 remains in the latch 12, the output of the comparator 18 is a pulse wave at frequency $f_o = 4,000$ Hz with each pulse having a width equal to the period of from 0 to 256 cycles of the clock having a frequency $f_c = 1,024,000$ Hz. The output on line 19 after passing through "or" gate 20 to line 21 is a pulse wave having a pulse width and duty cycle corresponding with the binary number N from the computer, and it is suitable after amplification for application to a fuel pump motor to control the speed of operation of the motor.

The 2 low-order bits from the computer 10 are loaded into a 2-bit latch under control of a strobe signal on line 23. If the computer 10 has an output bus of only 8 bits, the transfer of 2 bits to the 2-bit latch may occur during a following computer cycle. The signal from the computer may, of course, have different numbers of high-order bits N and low-order bits n than are described herein by way of example. A 2-bit ring counter 24 repeatedly counts 4 cycles of the $f_o = 4,000$ Hz output at 15 of the N-bit counter 14. The contents of the 2-bit latch 22 and the 2-bit counter 24 are applied to a 2-bit comparator 28. The comparator 28 provides an output at 29 which is high so long as the number in the counter 24 is less than the number in the latch 22. So long as a given binary number between 0 and 4 remains in the latch 22, the output of the comparator 28 is a pulse wave at frequency $f_m = 1,000$ Hz with each pulse having a width equal to from 0 to 4 cycles of the input frequency $f_o = 4,000$ Hz. The output on line 29 is applied through an "and" gate 30 and the "or" gate 20 to the fuel pump motor when the "and" gate 30 is enabled, as will be described.

The described components may be as follows:

| Unit | RCA Model No. |
|---|---|
| N-bit latch 12 | CD4042 |
| n-bit latch 22 | CD4042 |
| N-bit counter 14 | CD4024 |
| n-bit counter 24 | CD4024 |
| N-bit comparator 18 | CD4063 |
| n-bit comparator 28 | CD4063 |

The output 17 of the $f_c$ clock 16 is coupled to the clock input C of a flip-flop 32 which may be a Model CD4013 unit made by RCA Corporation. The output 19 of the comparator 18 is coupled to the D input of the flip-flop, and the output Q of the flip flop is coupled through a delay device 34 to the input 35 of "and" gate 30. The delay device, which may be an RCA CD4047 monostable circuit, provides a time delay equal to the delay through the N-bit counter 14 and the N-bit comparator 18. The purpose of the logic circuit including the flip-flop 32 and the delay device 34 is to extend the width of a pulse on lines 19 and 21 by a one-step increment equal to the period of one cycle of the clock when "and" gate 30 is enabled by a "high" signal on line 29 from n-bit comparator 28. The clock in the present example has a period of about one microsecond.

Figure 2:
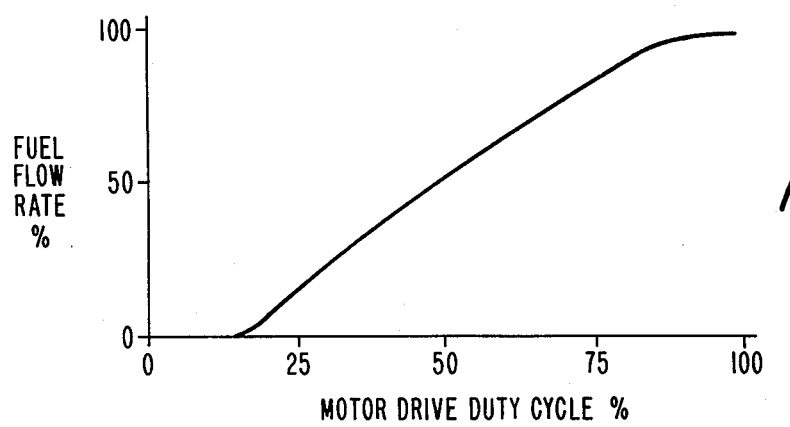
FIG. 2 is a chart of fuel flow rate vs. pulse wave duty cycle which will be referred to in describing an application of the apparatus of FIG. 1.

In the operation of the system of FIG. 1, the computer 10 responds to sensors in the automobile and computes a desired fuel flow rate to the engine. The computer then computes the corresponding motor drive current duty cycle from the pump/motor transfer characteristic, which may be a relationship as shown by FIG. 2. The result of the computer computations is a binary number including N high-order bits and n low-order bits, where N may be 8 and n may be 2. An 8-bit number has $2^N = 2^8 = 256$ digital steps between 0 and 100% duty cycle. When each step is a $2^{-N} = 2^{-8} = 1/256$ part of 100 percent current drive duty cycle, the steps may be too large and coarse, particularly at the low values of duty cycle in FIG. 2. A finer control, more nearly following the analog characteristic shown in FIG. 2, is provided by the additional low-order bits n, which are used to provide a finer control of the fuel pump motor without employing a higher clock frequency $f_c$.

If the computer 10 has supplied a binary number 1100 0000 equal to a 75 percent duty cycle to the N-bit latch 12 when the N-bit counter starts counting clock pulses, the output at 19 from the comparator 18 is a pulse starting when the count is zero and continuing until the count in the counter is 192 (75 percent of 256) and equals the binary number 1100 0000 in the latch 12. The pulse wave supplied over line 19 and through "or" gate 20 to line 21 is then as shown by waveform (a) of FIG. 2. The "high" portion of each period occupies 75% of the period, and the "low" portion 25%. Waveform (b) shows the output pulse wave when the binary number N from the computer is 1000 0000 (50 percent of 256), and waveform (c) shows the output pulse wave when the binary number N is 0100 0000 (25 percent of 256). The pulse widths, and duty cycles, can vary in 256 steps from 0 to 100 percent depending on the 8-bit binary number N supplied by the computer.

Figure 3:
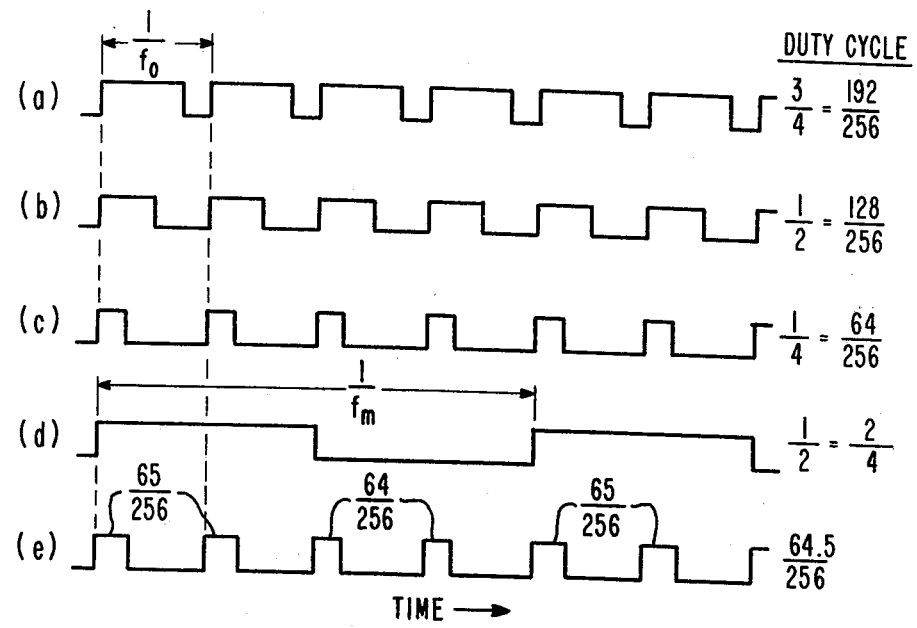
FIG. 3 is a chart of pulse waves which will be referred to in describing the operation of the apparatus of FIG. 1.

Now assume that the computer supplies the 2-bit low-order binary number 01 to the n-bit latch 22 at the same time that it supplies the high-order binary number 0100 0000 to the N-bit latch 12. The n-bit ring counter 24 repeatedly counts the 4,000 Hz pulses received over line 15 in the binary sequence 00, 01, 01, 11. The output of comparator 28 is "high" when the contents of counter 24 is 00 and 01, and is "low" when the contents is 10 and 11. The output of comparator 28 on line 29 is a pulse wave as shown at (d) in FIG. 3 having a frequency $f_m = 1,000$ Hz and a duty cycle of 50 percent. When the output of comparator 28 is "high", it enables the "and" gate 30 to pass pulses which have trailing edges delayed the amount of one clock cycle beyond the trailing edges of the pulses on line 19 from the N-bit comparator 18. Therefore, the output at 21 from the "or" gate 20 is as shown by waveform (e) in FIG. 3 where the pulses labeled 65/256 are one clock cycle wider than the pulses labeled 64/256 = ¼. A one-clock-cycle, one-step, width is $2^{-N} = 2^{-8} = 1/256$ of 100 percent. As can be seen, one half of the pulses have a width of 64 clock cycles, and one half have a width of 65 clock cycles. The average width of the pulses is 65.5 clock pulses, and the electric motor driven by the pulses responds as though all clock pulses had a width of 65.5 clock pulses. Thus, there is an effective increase in the fineness of steps in the amount of current between 0 and 100 percent supplied to the motor.

In the example given, the pulses of waveform (c) from the 8-bit comparator 18 have a width of 64 clock cycles out of 256 to provide a 25 percent duty cycle. The pulses of waveform (d) from the 2-bit comparator 28 have a width of 2 out of 4, or one half of the cycles of the 4,000 Hz wave $f_o$. As a result the output waveform (e) has an average width of 64.5 clock cycles. If the 2-bit latch contains a binary 01, the output pulses at 21 will have an average width of 64.25 clock pulses; and if the 2-bit latch contains a binary 11, the output pulses will have an average width of 64.75 clock cycles. It will be understood by those skilled in the art that n can be increased from 2 to a higher number such as 4 or 8, if a greater increase in the fineness in the effective average pulse widths is desired.

Figure 4:
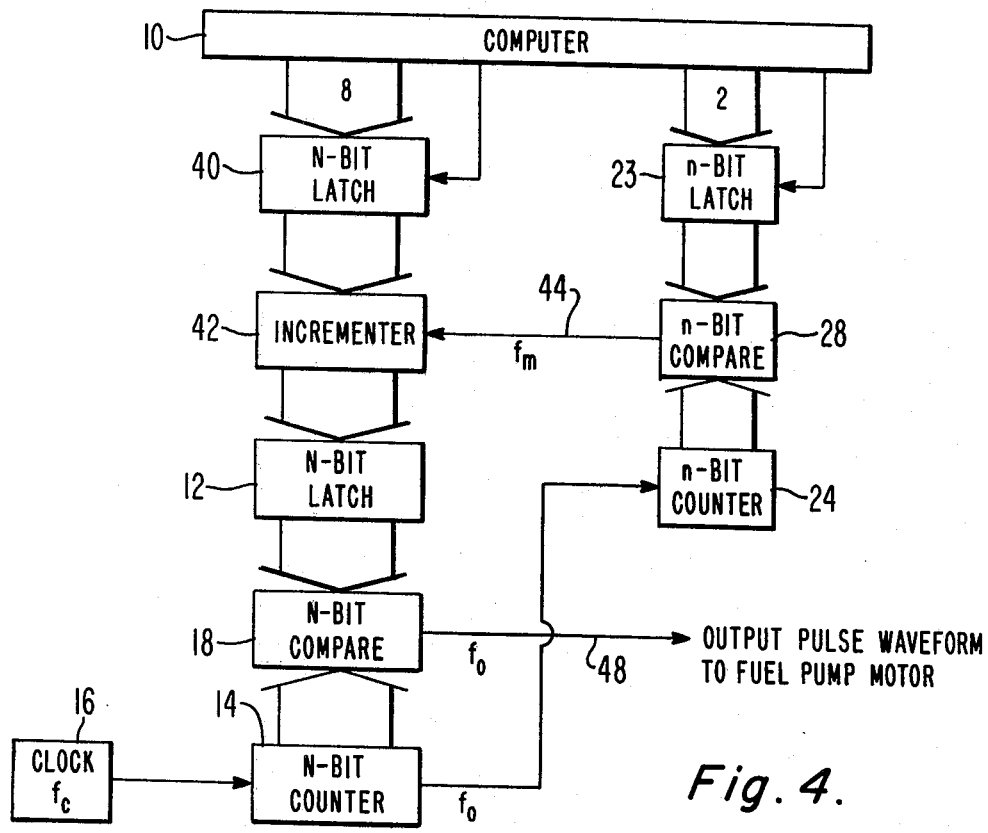
FIG. 4 is a block diagram of an alternative embodiment of the apparatus shown in FIG. 1.

Reference is now made to FIG. 4 for a description of an implementation which is an alternative to that shown in FIG. 1. Elements in FIG. 4 which correspond with elements in FIG. 1 are given the same numerals. An extra N-bit latch 40, is provided, as well as an incrementer 42 which receives incrementing commands over line 44 from the n-bit comparator 28. The incrementer 42 may be an RCA Model CD4008 integrated circuit adder unit connected to operate as an incrementer. The n-bit counter 24 counts output pulses at frequency $f_o$ from the N-bit counter 14. The frequency $f_o$ may be 4,000 Hz as in FIG. 1.

In the operation of FIG. 4, the N-bit comparator 18 provides an output pulse wave, as described in connection with FIG. 1, which has a pulse width and duty cycle according to the value of the 8-bit binary number supplied from the computer 10 through latch 40, incrementer 42 and latch 12. The n-bit comparator 28 operates as described in connection with FIG. 1, but its output is applied to incrementer 42 to increment the 8-bit binary number a proportion of the time determined by the value of the 2-bit binary number supplied from the computer 10 to the latch 23. The 8-bit binary number may have any integral whole number value between 0 and 256, and it is incremented by one half of the time if the 2-bit binary number is 10. It is incremented by one quarter of the time if the n-bit binary number is 01, and is incremented three-quarters of the time if the n-bit binary number is 11. Therefore, the average width or duty cycle of pulses from output 48 may be a half step, a quarter step or a three-quarter step greater than a whole number between 0 and 256. The system operates like the system of FIG. 1 to provide a fine control to an electric motor driven by the current pulses without resort to an increase in the frequency $f_c$ of the clock 16.

What is claimed is:

1. Means to generate a variable electric drive signal for application to a utilization device, comprising
   a source of a binary signal representing a desired drive current amplitude, said signal including N high-order bits and n low-order bits,
   first means to generate a pulse waveform having a fixed frequency $f_o$ higher than the frequency to which the utilization device can respond, having a variable pulse width duty cycle, and having pulses with widths in accordance with the value of said high-order bits, whereby the pulses may have any one of $2^N$ discrete widths, and
   second means to make an increase in the widths of a proportion of the pulses of said pulse waveform determined by the value of said low-order bits.

2. The combination of claim 1 wherein said utilization device is an electric motor.

3. The combination of claim 1 wherein said second means makes a one-step increase equal to $2^{-N}$ in the widths of a proportion of the pulses.

4. The combination of claim 1 wherein said first means includes a source of a first clock signal, an N-bit counter driven by the first clock signal, and an N-bit comparator receptive to the count in said N-bit counter and the N high-order bits from said source of a binary signal and having an output providing said pulse waveform of frequency $f_o$.

5. The combination of claim 4 wherein said N-bit comparator provides a "high" output solely when the count in the N-bit counter is less than the value of the N high-order bits from said source of a binary signal.

6. The combination of claim 5 wherein said second means includes an n-bit counter driven by a clock signal having a frequency which is a submultiple of the frequency of said first clock, and an n-bit comparator receptive to the count in said n-bit counter and the n low-order bits from said source of a binary signal and having an output providing a pulse wave having a fixed frequency $f_m$ and having pulses with widths in accordance with the value of said high-order bits.

7. The combination of claim 6 wherein said n-bit comparator provides a "high" output solely when the count in the n-bit counter is less than the value of the n low-order bits from said source of a binary signal.

8. The combination of claim 7 wherein said second means also includes a logic circuit operative whenever a pulse in the waveform of frequency $f_o$ occurs during a pulse in the waveform of frequency $f_m$ to cause a one-step increase in the width of a pulse in the waveform of frequency $f_o$.

9. The combination of claim 8 wherein said logic circuit includes a time delay unit, and "and" gate and an "or" gate.

10. The combination of claim 8 wherein said logic circuit includes an incrementer.

* * * * *